(12) United States Patent
Clark et al.

(10) Patent No.: US 7,782,060 B2
(45) Date of Patent: Aug. 24, 2010

(54) INTEGRATED ELECTRODE RESISTIVITY AND EM TELEMETRY TOOL

(75) Inventors: Brian Clark, Sugar Land, TX (US); Jan W. Smits, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 533 days.

(21) Appl. No.: 11/617,216

(22) Filed: Dec. 28, 2006

(65) Prior Publication Data

US 2008/0156534 A1    Jul. 3, 2008

(51) Int. Cl.
G01V 3/02    (2006.01)
(52) U.S. Cl. .................. 324/369; 324/366; 175/50
(58) Field of Classification Search .......... 324/347–364
See application file for complete search history.

(56) References Cited

U.S. PATENT DOCUMENTS

| | | | |
|---|---|---|---|
| 2,400,170 A | 5/1946 | Silverman | |
| 2,961,600 A * | 11/1960 | Tanguy ..................... | 324/374 |
| 4,860,581 A | 8/1989 | Zimmerman et al. | |
| 4,876,511 A | 10/1989 | Clark | |
| 4,899,112 A | 2/1990 | Clark et al. | |
| 4,936,139 A | 6/1990 | Zimmerman et al. | |
| 4,949,045 A | 8/1990 | Clark et al. | |
| 4,968,940 A | 11/1990 | Clark et al. | |
| 5,235,285 A | 8/1993 | Clark et al. | |
| 5,339,036 A | 8/1994 | Clark et al. | |
| 5,359,324 A | 10/1994 | Clark et al. | |
| 5,396,232 A | 3/1995 | Mathieu et al. | |
| 5,463,320 A * | 10/1995 | Bonner et al. .............. | 324/366 |
| 5,517,464 A | 5/1996 | Lerner et al. | |
| 5,530,358 A | 6/1996 | Wisler et al. | |
| 5,642,051 A | 6/1997 | Babour et al. | |
| 5,781,436 A | 7/1998 | Forgang et al. | |
| 5,883,516 A * | 3/1999 | Van Steenwyk et al. ..... | 324/366 |
| 6,114,972 A | 9/2000 | Smith | |
| 6,188,222 B1 | 2/2001 | Seydoux et al. | |
| 6,188,223 B1 * | 2/2001 | Van Steenwyk et al. ..... | 324/370 |
| 6,208,265 B1 | 3/2001 | Smith | |
| 6,348,796 B2 * | 2/2002 | Evans et al. .................. | 324/374 |
| 6,373,254 B1 * | 4/2002 | Dion et al. .................. | 324/369 |
| 6,396,276 B1 * | 5/2002 | Van Steenwyk et al. ..... | 324/366 |
| 6,445,307 B1 | 9/2002 | Rassi et al. | |
| 6,509,738 B1 | 1/2003 | Minerbo et al. | |
| 6,577,129 B1 | 6/2003 | Thompson et al. | |
| 6,577,244 B1 | 6/2003 | Clark et al. | |
| 6,677,756 B2 | 1/2004 | Fanini et al. | |
| 6,727,827 B1 | 4/2004 | Edwards et al. | |
| 7,436,184 B2 * | 10/2008 | Moore ......................... | 324/347 |
| 2007/0052551 A1 | 3/2007 | Lovell et al. | |

* cited by examiner

*Primary Examiner*—Jay M Patidar
(74) *Attorney, Agent, or Firm*—Darla Fonseca; Brigitte Echols; Charlotte Rutherford

(57) ABSTRACT

An integrated electrode resistivity and EM telemetry tool and obtaining both formation resistivity and telemetry data from the integrated tool. An integrated electrode resistivity and EM telemetry tool having a drill collar including a first portion and a second portion separated by an insulated gap and telemetry cartridge carrying telemetry circuitry including a voltage source generating a voltage drop across the insulated gap and an axial current on a drill string that returns through an earthen formation includes an insulated measure electrode connected to the first portion, and resistivity measurement circuitry functionally connected to the measure electrode and the telemetry circuitry.

26 Claims, 9 Drawing Sheets

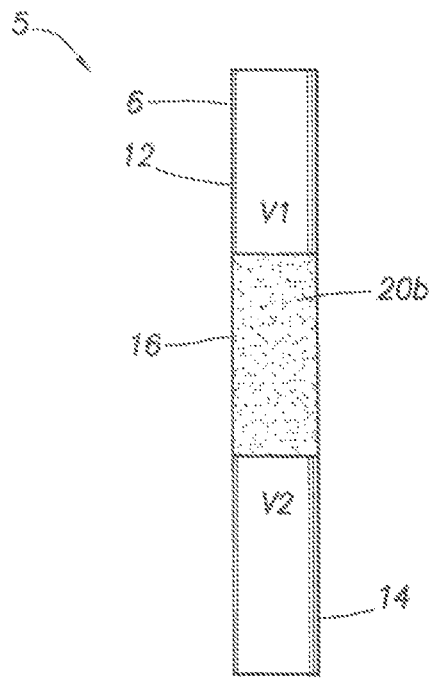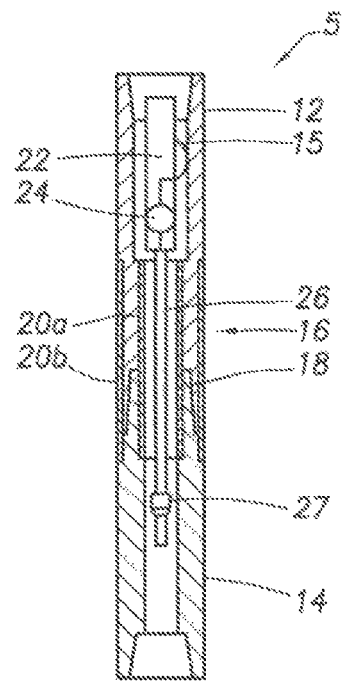
FIG. 1A
(PRIOR ART)
FIG. 1B
(PRIOR ART)
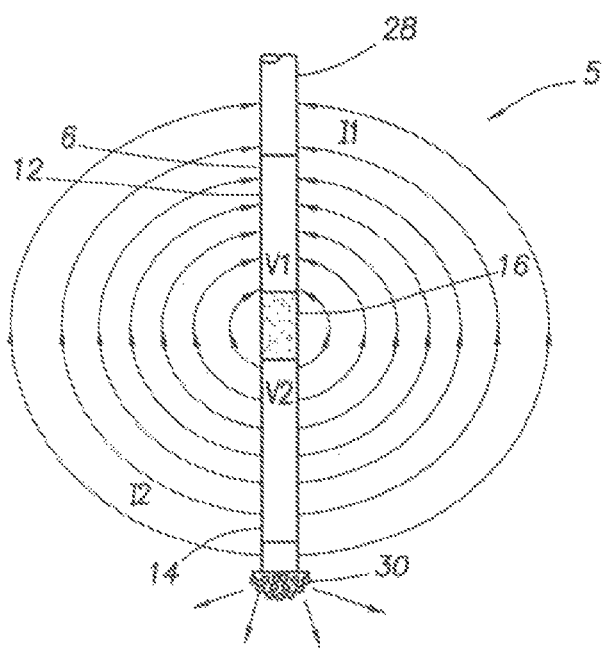
FIG. 1C
(PRIOR ART)

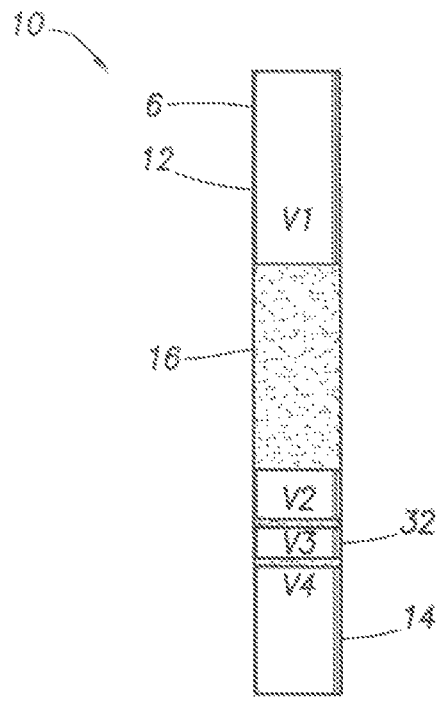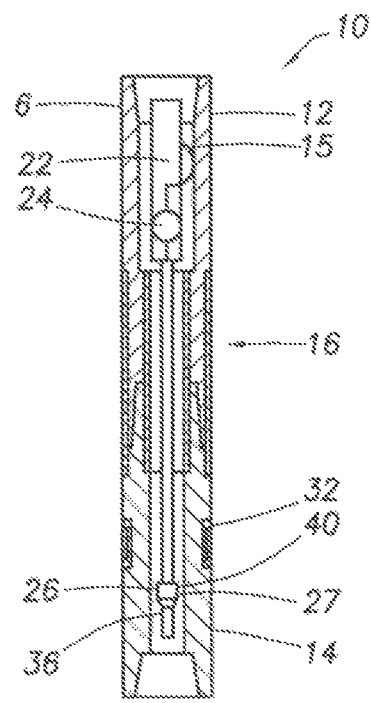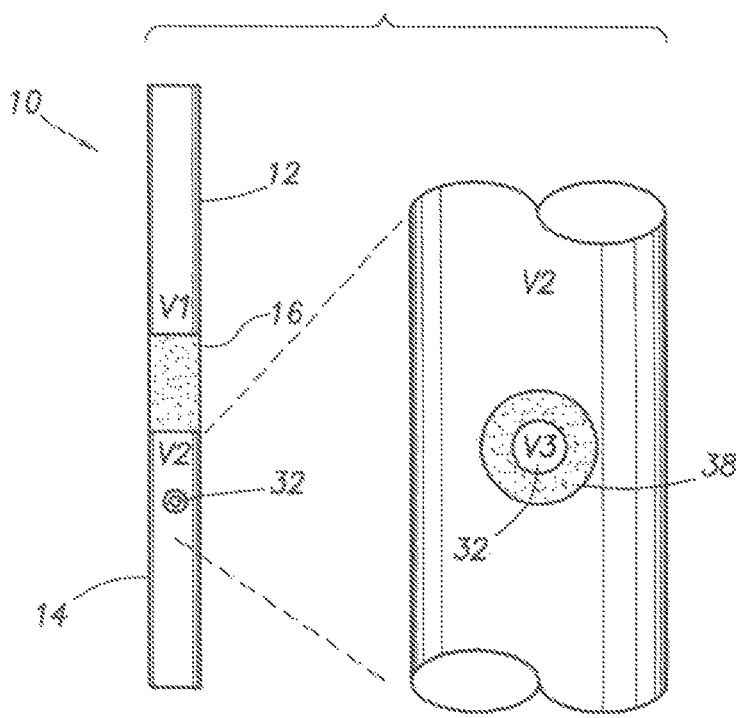

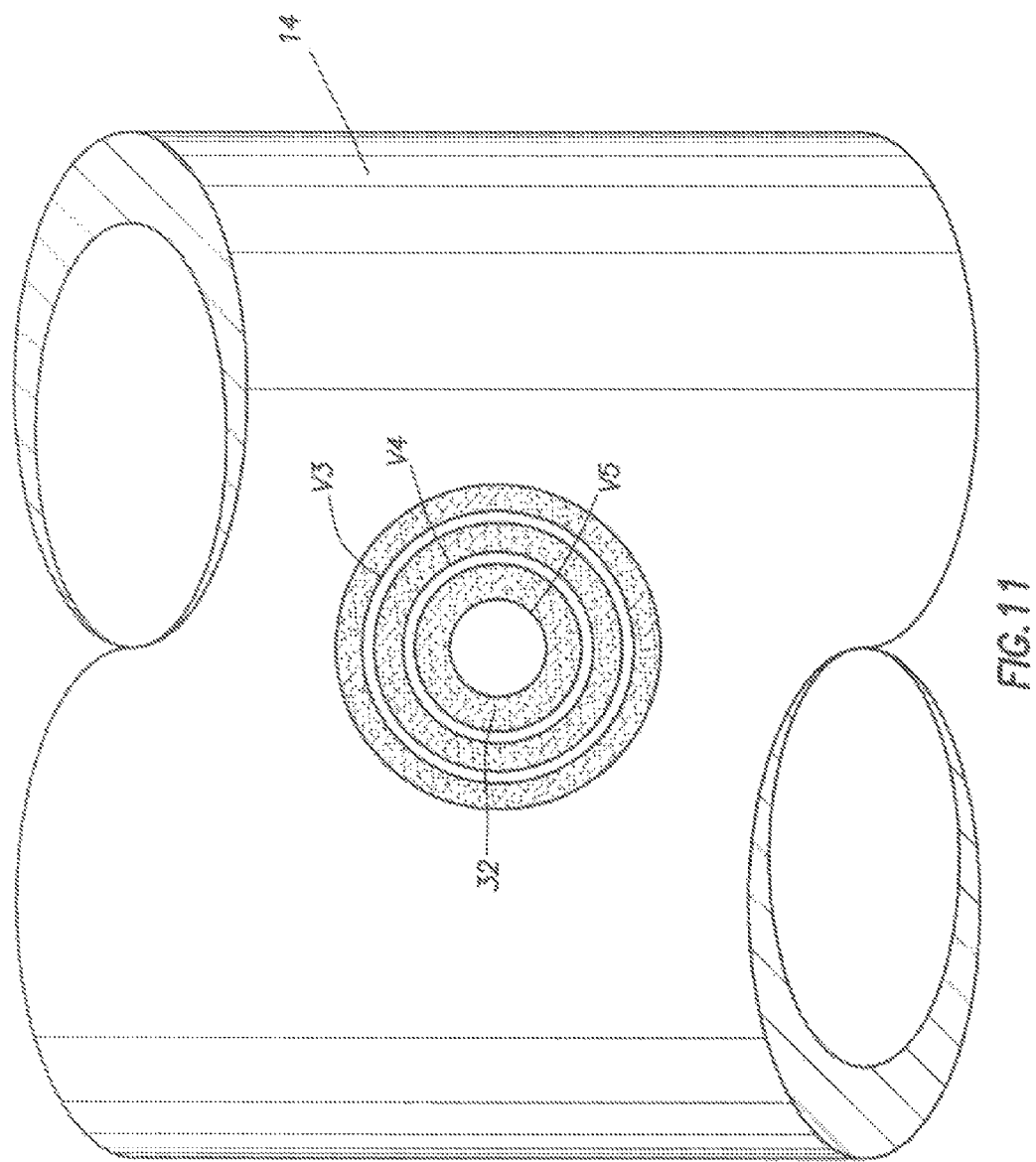

US 7,782,060 B2

INTEGRATED ELECTRODE RESISTIVITY AND EM TELEMETRY TOOL

FIELD OF THE INVENTION

The present invention relates in general to wellbore operations and more specifically to methods and apparatus for integrating resistivity measurements into an electromagnetic ("EM") telemetry tool.

BACKGROUND

In wellbore drilling operations, information regarding subterranean formations and the position of the bottomhole assembly ("BHA") are often needed to drill the wellbore in an efficient and cost-effective manner. Thus, in many wells the bottomhole assembly is equipped with an electromagnetic measurement-while-drilling ("MWD") telemetry tools. These MWD tools provide a current through the surrounding formation and via telemetry circuitry provide telemetry information regarding the BHA. This information is vital to control the trajectory of the wellbore and to successfully position the wellbore relative to desired reservoir formations.

In addition to telemetry information it is often necessary to have formation information available so as to accurately position the wellbore. In practice, a logging tool, such as a resistivity tool is run into the wellbore to obtain information useful to identify particular formation. Currently the resistivity information is obtained by running a separate logging tool into the wellbore to obtain the desired information. Conducting logging operations separate from the drilling operation significantly increases the cost of the drilling operations. The extra expense is justified in some situations. However, in other situations the costs are not justified and the operator is left with controlling the trajectory of the wellbore on limited formation information.

Therefore, it is a desire to provide a formation resistivity measurement into an electromagnetic telemetry tool.

SUMMARY OF THE INVENTION

In view of the foregoing and other considerations, apparatus and methods for integrating resistivity measurements capabilities into an EM telemetry tool and obtaining both resistivity and telemetry data is provided.

In an embodiment of the present invention an integrated electrode resistivity and EM telemetry tool having a drill collar including a first portion and a second portion separated by an insulated gap and telemetry cartridge carrying telemetry circuitry including a voltage source generating a voltage drop across the insulated gap and an axial current on a drill string that returns through an earthen formation includes an insulated measure electrode connected to the first portion, and resistivity measurement circuitry functionally connected to the measure electrode and the telemetry circuitry.

In an embodiment of a method of obtaining a formation resistivity from a measurement-while-drilling electromagnetic telemetry tool having a drill collar including a first portion and a second portion separated by an insulated gap and telemetry cartridge carrying telemetry circuitry including a voltage source generating a voltage drop across the insulated gap and an axial current on a drill string that returns through an earthen formation includes the steps of providing an insulated measure electrode on the first portion and a resistivity measurement circuitry functionally connected to the measure electrode and the telemetry circuitry; producing a voltage across the insulated gap driving an electrical current into the surrounding earthen formation; obtaining telemetry information; and obtaining resistivity measurement of the earthen formation.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIGS. 1A-1C are illustrations of a common EM telemetry MWD tool;

FIGS. 2A-2B are illustrations of an embodiment of an integrated electrode resistivity and EM telemetry tool utilizing ring measure electrodes;

FIG. 2C is a view of an embodiment of an integrated electrode resistivity and EM telemetry tool utilizing button measure electrodes;

FIG. 11 is a diagram of a button electrode with a pair of sense ring electrodes.

DETAILED DESCRIPTION

Figure 3:
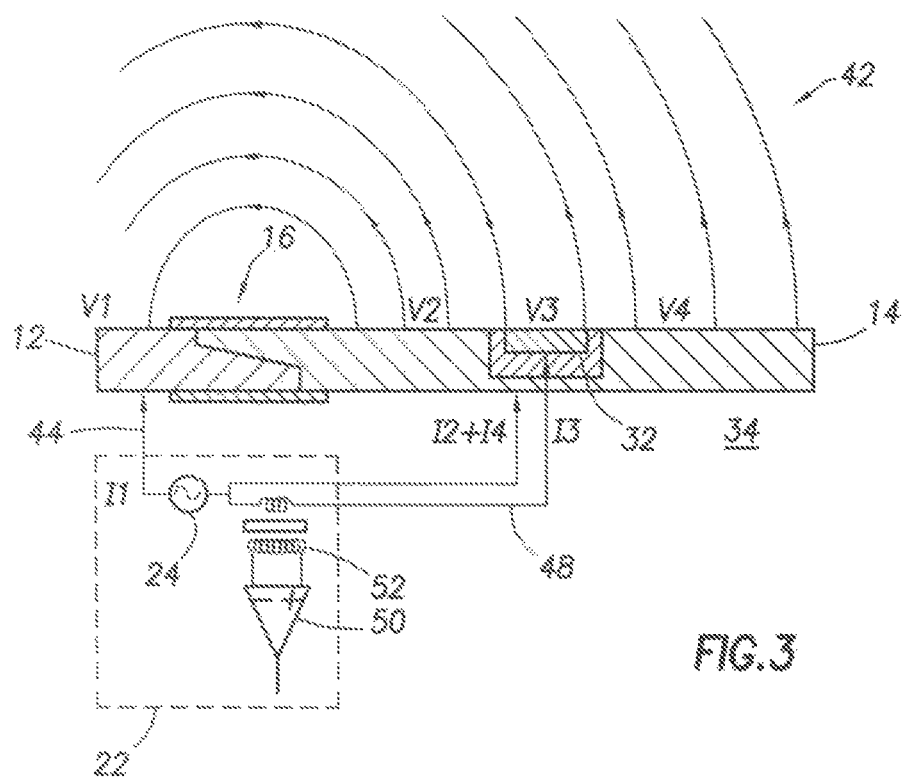
FIG. 3 is a schematic diagram of a resistivity measurement system and circuit.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

FIGS. 1A through 1C illustrate a prior art electromagnetic telemetry tool, or measurement while drilling ("MWD") tool, generally designated by the numeral 5. MWD tool 5 includes a drill collar 6 having a first portion 12 and a second portion 14 separated by an insulated gap 16. In the illustrations, first portion 12 is the top drill collar joint and second portion 14 is the lower or bottom portion of the drill collar for purposes of illustration and not for limitation. Unless specified otherwise, first portion 12 may be the top or bottom portion of the drill collar and second portion 14 is the opposite portion relative to insulated gap 16. Insulated gap 16 commonly includes a ceramic-coated pin connection 18 and internal and external 20a, 20b insulation to prevent water entry into ceramic-coated pin connection 18. Thin fiberglass-epoxy cylinders provide insulation inside and outside of drill collar 6.

An electronics cartridge 22 is located in first portion 12, and preferably in the upper portion for retrieval. Electronics cartridge 22 includes a voltage source 24 and the telemetry circuitry and is electrically connected (electrical contact 15) directly to first portion 12 of the drill collar 6. Electronics cartridge 22 may also include other instruments such as a gamma-ray sensor and survey instruments. An insulated metal stinger 26 carries wires through the inside of drill collar 5 from electronics cartridge 22 to second portion 14. Stinger 26 plugs into an electrical contact (receptacle) 27 in second portion 14 and an electric current passes through the wires to second portion 14. As previously indicated, it is desirable for electronics cartridge 22 to be positioned in the upper portion of the drill collar so that the cartridge and the stinger may be removed from the wellbore with a wireline fishing operation if necessary.

In operation, as illustrated in FIG. IC, tool 5 is positioned in a wellbore or borehole drilled in the earth. Tool 5 generates a voltage drop across insulated gap 16 producing an axial current on the drill string that returns through the earthen formation. The first and second portions 12, 14 form two electrodes with voltages V1 and V2 respectively. In a homogeneous medium, the currents in the formation flow in roughly spherical shells. Tool 5 can produce a strong electric current that flows along the entire lower portion of the bottom-hole assembly ("BHA") 28 to the drill bit 30.

FIGS. 2A through 2C illustrate representative embodiments of an integrated electrode resistivity and EM telemetry tool of the present invention, generally denoted by the numeral 10. Integrated tool 10 comprises telemetry tool 5 described above and further includes one or more measure electrodes 32 to provide a resistivity measurement in EM telemetry tool 5. By adding measure electrode 32 and associated electronics to tool 5 and utilizing insulated gap 16 and electronics cartridge 22 a good quality resistivity measurement with excellent vertical resolution that is cost-effective can be obtained.

Measure electrode 32 may be a ring electrode (FIGS. 2A and 2B) or a button electrode (FIG. 2C). Ring electrodes are azimuthally symmetric and facilitate detection of very thin formation beds (e.g., three inches with a two inch electrode). Button electrodes are azimuthally sensitive, allowing azimuthal variations in resistivity to be measured. Button electrodes facilitate borehole imaging, which can be used to determine dip, to detect fractures, and to geosteer in deviated wells. It should be recognized that ring and button electrodes may be used in combination in the present invention. Throughout the specification, ring and button electrodes will be referred to generally as measure electrode 32 for convenience and the representative drawings will generally indicate and refer to ring electrodes. However, the invention applies equally well to ring and button electrodes.

With reference to FIGS. 2A-2C, the general concept of the present invention will be described in relation to a ring electrode. An insulated measure electrode 32 is positioned on second or lower portion 14, although it can be positioned on either side of insulated gap 16. Measure electrode 32 is insulated 38 from drill collar 6. Measure electrode 32 is connected to electronics cartridge 22 via stinger 26. It should be further recognized that measure electrode 32 and the associated resistivity circuitry may be positioned on a sub within the BHA separate from the telemetry MWD tool.

The electrode may be connected at the thick wall section of drill collar 6, where insulated gap 16 and the fiberglass-epoxy cylinders are located. Drill collar 6 should be longer than in tool 5 (approximately 1 to 2 feet) to provide room for measure electrode 32 and to provide a degree of focusing, which is provided by the portion of drill collar 6 labeled "V2" proximate to electrode 32. (FIGS. 2A and 2C). To manufacture the tool, a layer of fiberglass-epoxy may be used to insulate electrode 32 at the same time the fiberglass-epoxy is added to drill collar 6 over insulated gap 16. A groove may be machined into the fiberglass-epoxy for placement of electrode 32. Feed wires 40 may be connected to electrode 32, positioned in the groove, and connected to electrical contact 27. Measure electrode 32 requires a pressure bulkhead since the pressure differential between the interior (bore 34) and the exterior of drill collar 6 can be significant. Stinger 26 may include a "wet stab" connection 36 to prevent current from returning through bore 34 to first portion 12. A wet stab connection allows the electrical connection to be made-up with fluids present, such as drilling mud.

Electronics cartridge 22 maintains measure electrode 32 at the same potential as second portion 14 drill collar 6 in which electrode 32 is positioned. Lower portion 14 is an equipotential surface, thus, with reference to FIG. 2A, V2=V3=V4, wherein V2 is the potential of second portion 14 between insulated gap 16 and electrode 32, V3 is the potential of insulated measure electrode 32, and V4 is the potential of second portion 14 below insulated electrode 32. This configuration resembles an "LL3" array. An LL3 array is a wireline resistivity measurement system where a central measurement electrode has two long electrodes above and below it, and where all three electrodes are maintained at the same potential. The apparent resistivity from measure electrode 32 is given by $R_A = K_A(V3-V1)/I3$, where $K_A$ is a constant that depends on the geometry of the electrodes.

As previously indicated, a button electrode (FIG. 2C) may be used in addition to or in place of a ring electrode. Button electrode 32 may be mounted flush with the exterior of drill collar 6, or may be mounted on an upset (not shown) to reduce stand-off from the borehole wall.

Figure 4:
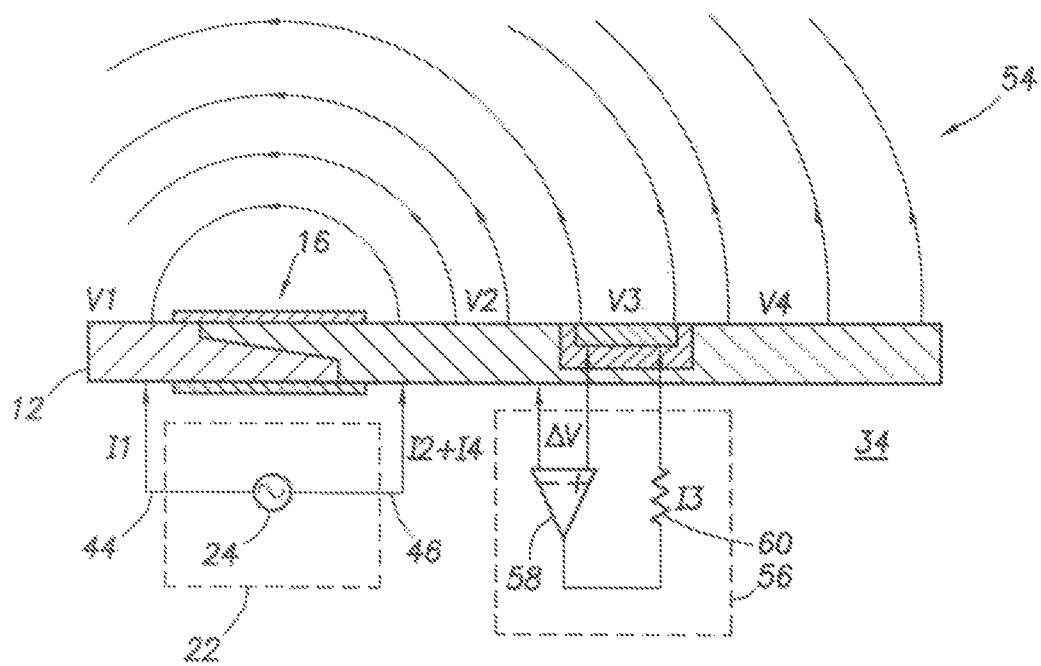
FIG. 4 is a schematic diagram of another resistivity measurement system and circuit utilizing a resistivity electronics package functionally connected to the telemetry electronics.
Figure 6:
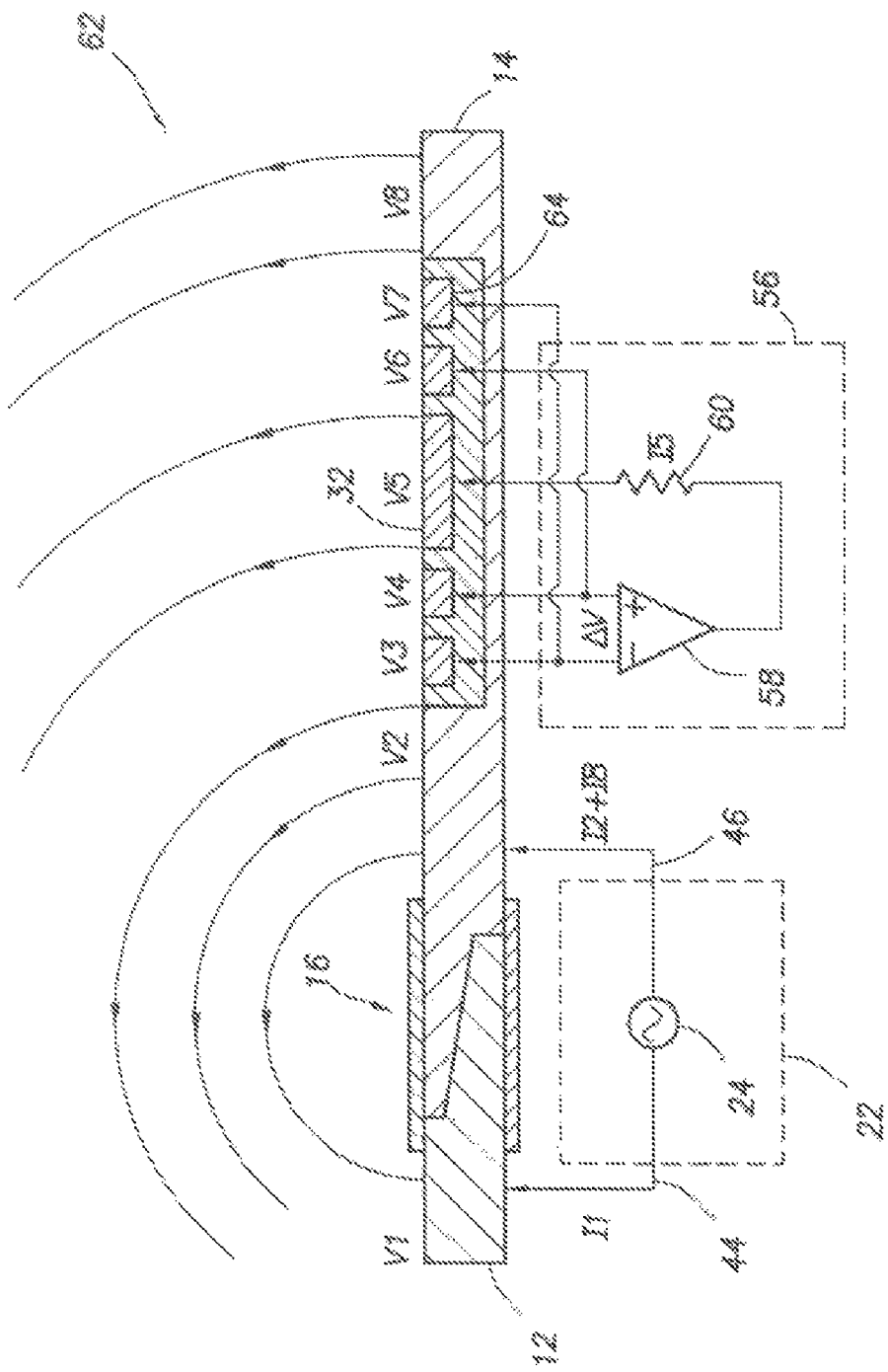
FIG. 6 is a schematic diagram of an focused array system and resistivity measurement circuit.

FIGS. 3, 4 and 6 are schematics of various circuitry for measuring resistivity of the present invention. In FIGS. 3, 4 and 6 measure electrode 32 is positioned in second portion 14.

FIG. 3 is a schematic diagram of a first resistivity measurement circuit 42 integrated into electronics cartridge 22, utilizing a current sensing transformer and low input impedance operational amplifier. Measure electrode 32 is connected to second portion 14 of the drill collar. Wire 44 is connected between voltage source 24 and first portion 12 and carries current (I1). Wire 46 is connected between voltage source 24 and second portion 14 and carries current (I2 and I4) to second portion 14 of the drill collar. A wire 48 is added connecting voltage source 24 and measure electrode 32, carrying electrode current (I3) to measure electrode 32. Electrode current I3 is measured using a low input impedance operational amplifier 50 and transformer 52. If wire 48, the current sampling transformer, and contacts have a low series impedances, then measure electrode 32 voltage V3 will be substantially the same as the voltage of second portion 14 of the drill collar (i.e., V3=V2=V4). The wet-stab connector at stinger 26 (FIG. 2B) ensures that all of the electrode current I3 passes outside of the drill collar and does not flow inside of the drill collar to first portion 12 (V1).

FIG. 4 is a schematic diagram of a second resistivity measurement circuit 54 incorporated into a front-end electronics package 56. Front-end, or resistivity, electronics 56 is positioned proximate to measure electrode 32 and provides focusing, provides measure electrode current I3, measures the current emitted, and digitizes the results for transmission back to electronics cartridge 22. Front-end electronics package 56 may be disposed in a pressure-tight housing located either inside the drill collar or in a pocket machined into the drill collar. Additional wiring (not shown) can connect power and functions between front-end package 56 and electronics package 22.

A high input impedance operational amplifier 58 is connected between second portion 14 of the drill collar and measure electrode 32. The voltage differential ΔV between measure electrode 32 and second portion 14 drives high input impedance operational amplifier 58. Operational amplifier's 58 output current I3 drives measure electrode 32 after passing through a calibrated resistor 60. The voltage drop across the calibrated resistor 60 is proportional to the current I3, and is recorded. Operational amplifier 58 drives the voltage differential to zero to maintain substantially the same potential at measure electrode 32 and second portion 14 of the drill collar. Second resistivity measurement circuit 54 may eliminate voltage errors that may occur in first measurement circuit 42 (FIG. 3).

Figure 5:
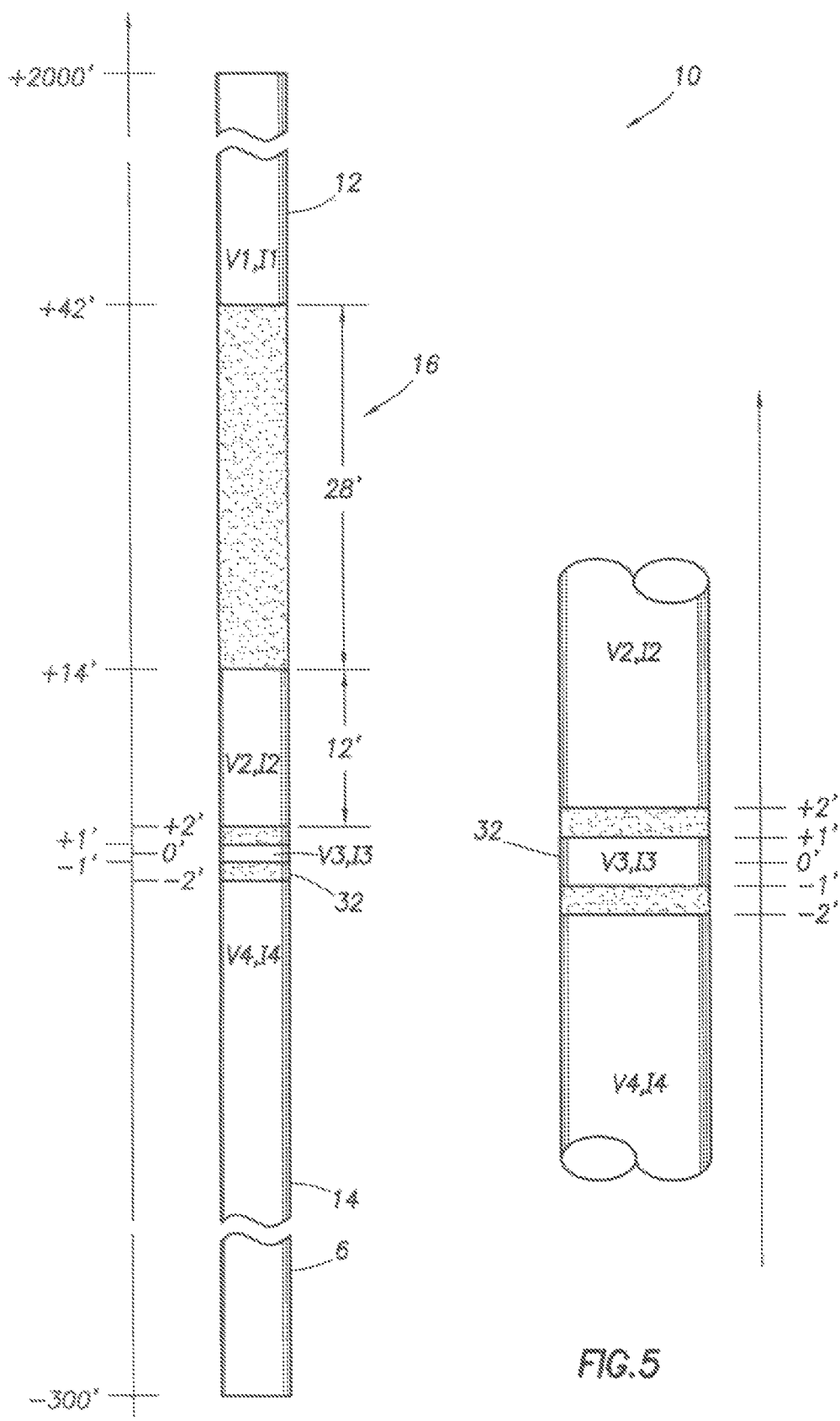
FIG. 5 is an illustration of an integrated tool for modeling integrated resistivity and telemetry tool response.

An example of an integrated tool 10 resistivity response utilizing the first or second circuits 42, 54 is provided. It will be recognized that the resistivity response present in relation to the first and second circuits is also applicable to the focused electrode array and circuit 62 described below. The geometry for tool 10 is provided in FIG. 5. Drill collars 6 have a diameter of seven inches (15.4 cm). Gap 16 has twenty-eight inches (61.6 cm) of fiberglass-epoxy insulation 20. Second portion 14 includes twelve inches (26.4 cm) of bare collar between gap 16 and measure electrode 32. Measure electrode 32 is a two inch (4.4 cm) ring electrode having one inch (2.2 cm) of insulation on either side. Two-hundred-ninety-eight inches (655.6 cm) of bare collar extends to below electrode 32. The center of measure electrode 32 is at z=0, the bit face at z=−300 inches (660 cm). The top of the drill string is at z=2000 inches (4400 cm) for purposes of modeling.

For modeling purposes, it is assumed that the voltage V3 on measure electrode 32 is the same as on the adjacent drill collar and that the electrode impedance effects are negligible. There are eight unknown quantities V1, V2, V3, V4, I1, I2, I3, and I4 corresponding to the voltages on, and the currents emitted from the various conductors. Second portion 14 of drill collar 6 is an equipotential surface (V2=V4). The focusing condition for measure electrode 32 is V3=V4. Conservation of current requires that I1+I2+I3+I4=0. I3 is forced to equal 1 amp to guarantee a non-trivial solution. The remaining four equations required for a solution are provided in the form of Equation 1:

$$Vi = \Sigma(Zij \cdot Ij) \quad \text{(EQ. 1)}$$

where Zij are the trans-impedances among the various electrodes, and the indices i and j both run from 1 to 4. The Zij elements are calculated using tool 10 geometry and the formation geometry and resistivities.

In matrix notation, the four equations are written as (Note that I is the current vector, not a unity vector):

$$\overline{V} = \overline{Z} \cdot \overline{I}. \quad \text{(EQ. 2)}$$

The voltage conditions can be rewritten as:

$$\begin{bmatrix} 0 & 0 & 0 & 0 \\ 0 & 1 & -1 & 0 \\ 0 & 0 & 1 & -1 \\ 0 & 0 & 0 & 0 \end{bmatrix} \cdot \begin{bmatrix} V1 \\ V2 \\ V3 \\ V4 \end{bmatrix} = \begin{bmatrix} 0 \\ 0 \\ 0 \\ 0 \end{bmatrix}; \quad \text{(EQ. 3a)}$$

or $$\overline{X} \cdot \overline{V} = \overline{0}. \quad \text{(EQ. 3b)}$$

The current conditions can be rewritten as:

$$\begin{bmatrix} 0 & 0 & 1 & 0 \\ 0 & 0 & 0 & 0 \\ 0 & 0 & 0 & 0 \\ 1 & 1 & 1 & 1 \end{bmatrix} \cdot \begin{bmatrix} I1 \\ I2 \\ I3 \\ I4 \end{bmatrix} = \begin{bmatrix} 0 \\ 0 \\ 0 \\ 0 \end{bmatrix}; \quad \text{(EQ. 4a)}$$

or $$\overline{Y} \cdot \overline{I} = \overline{B}. \quad \text{(EQ. 4b)}$$

The currents and the voltages can be solved following:

$$(\overline{X} \cdot \overline{Z} + \overline{Y}) \cdot \overline{I} = \overline{B}; \quad \text{(EQ. 5)}$$

$$\overline{I} = (\overline{X} \cdot \overline{Z} + \overline{Y})^{-1} \cdot \overline{B}; \text{ and} \quad \text{(EQ. 6)}$$

$$\overline{V} = \overline{Z} \cdot \overline{I}. \quad \text{(EQ. 7)}$$

The apparent resistivity determined from insulated gap 16 to drill bit 30 (FIG. 1C), referred to as the "bit resistivity", is given by:

$$R_B = \frac{-K_B(V3 - V1)}{I1}. \quad \text{(EQ. 8)}$$

The negative sign is required because I1<0 by convention. The K-factors for measure electrode 32 and bit resistivities can be obtained by modeling in a very thick 1 ohm-m bed, without a borehole, and demanding that $R_A = R_B = 1$ ohm-m.

Referring now to FIG. 6, a schematic diagram of a third resistivity measurement circuit 62 is provided. Circuit 62 is incorporated into a front-end, or resistivity, package 56. Front-end electronics package 56 may be disposed in a pressure-tight housing located either inside the drill collar or in a pocket machined into the drill collar. Additional wiring (not shown) can connect power and functions between front-end package 56 and electronics package 22.

Circuit 62 is similar to circuit 54, including a high input impedance amplifier 58 and calibrated resistor 60. The voltage is measured across the calibrated resistor 60 to determine the current I3. The system of circuit 62 includes sense electrodes 64 connected to the same portion of the drill collar as measure electrode 32, second portion 14 in the illustrated embodiments. In the case of a ring electrode (illustrated), sense electrodes 64 are thin rings relative to measure electrode 32. In the case of a button electrode, sense electrodes 64 are circular rings that surround and are concentric with the button electrode.

In the embodiment illustrated in FIG. 6, the voltage on the four sense electrodes 64 are identified individually by V3, V4, V6, and V7. The voltages on upper portion 14 of the drill collar are identified with V2 and V8, and the voltage on measure electrode 32 is identified as V5.

The two outermost sense electrodes 64, relative to measure electrode 32, are shorted together, thus V3=V7. The two innermost sense electrodes 64, relative to measure electrode 32, are also shorted together, thus V4=V6.

High input impedance operational amplifier 58 drives the voltage drop to zero (i.e., V3−V4=V7−V6→0; or V3+V7−V4−V6=0. The current I5 on measure electrode 32 is determined from the voltage across resistor 60.

There are several advantages to the system of circuit 62. First, when the voltage drop across sense electrodes 64 is zero, there is no net axial current flowing in the borehole near measure electrode 32. Thus, the current emitted from measure electrode 32 flows radially into the formation. This minimizes the borehole effect and allows very high formation resistivities to be measured in very low resistivity drilling fluids.

The system of circuit 62 greatly reduces the electrode impedance effects that might be present in other measurement circuits. Electrode impedance effects are caused by the difference between metal conductors and fluid conductors. Electrons in the metal's conduction bands carry the electrical current in an electrode, while ions in solution carry the current in the drilling fluid. The transfer of electric charge across the metal-fluid interface involves a chemical process that can be modeled as electrode impedance. In the system of circuit 62, there is no current flow on the sense electrodes because the operation amplifier has very high input impedance. Thus, the sense electrodes measure the true electric potential in the borehole, and the condition of zero voltage difference in the borehole is rigorous.

FIG. 11 is a drawing of a button measure electrode 32 surrounded by a pair of sense ring electrodes. The voltage difference measured between the pair of sense electrodes (V3−V4) drives a high input impedance amplifier which drives circuitry 62 as shown in FIG. 6. FIG. 6 applies directly to the button electrode of FIG. 11, where V3 and V7 represent the opposite sides of the outer sense ring electrode, and where V4 and V6 represent the opposite sides in the inner sense ring electrode.

Figure 7:
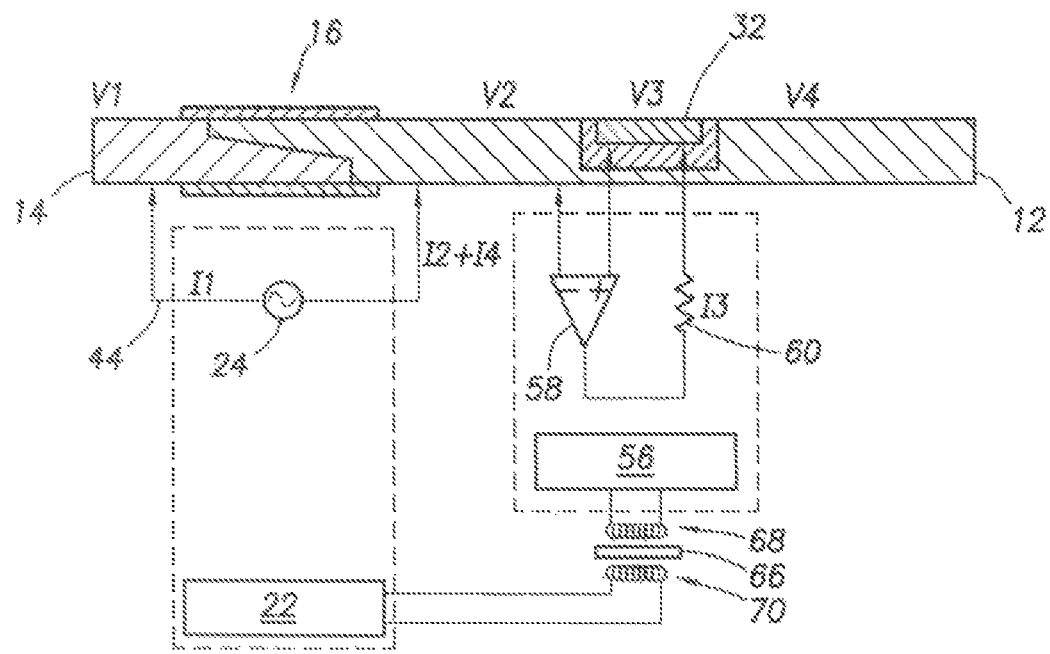
FIG. 7 is a schematic diagram of an embodiment of an integrated resistivity and telemetry tool with an inductive coupler.

FIG. 7 is a schematic diagram of an embodiment utilizing an inductive coupler. The present embodiment supplies power to front-end electronics 56 (FIGS. 4 and 6) and electrically and functionally connects front-end electronics 62 and electronics cartridge 22. The present embodiment eliminates the need for wet-stab electrical connections and eliminates the need for a precise axial alignment of stinger 26 so that some axial motion of the stinger is permitted.

Inductive coupler 66 system is illustrated in FIG. 7 in relation to the focused circuit 54 system of FIG. 4, however, it is noted that it is adapted to any system having a remote resistivity package such as illustrated in FIG. 6.

Figure 8:
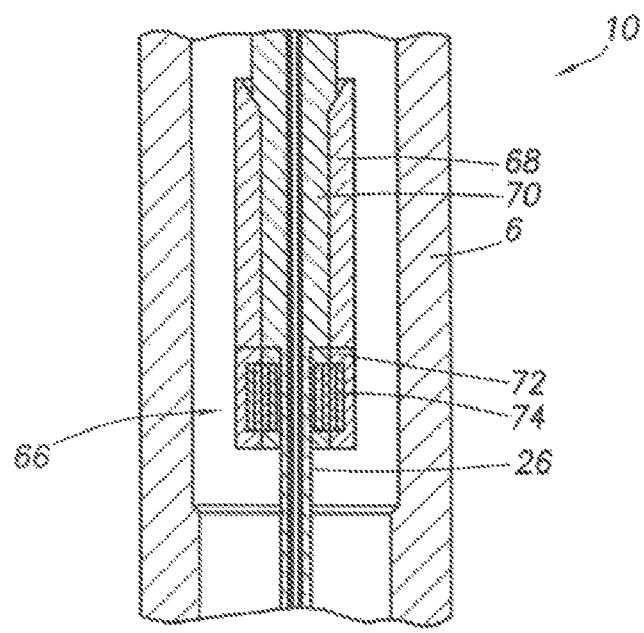
FIG. 8 is a cross-sectional view of the inductive coupler of FIG. 7.

Referring now to FIGS. 7 and 8, inductive coupler 66 system is further described. Inductive coupler 66 is implemented in the landing and orienting hardware. The mule shoe sleeve 68 is located above gap 16 and is centered inside of drill collar 6. The mule shoe 70 is located at electronics cartridge 22 and orients cartridge 22 azimuthally and aligns it axially with drill collar 6. Half of the inductive coupler 66 is mounted at the lower end of mule shoe sleeve 68 and is operationally connected to the front-end electronics 56 and the other half is mounted at the lower end of mule shoe 70 and is operationally connected to the telemetry cartridge 22. Each half of coupler 66 includes a high magnetic permeability core 72 and windings 74.

With reference to FIGS. 3 through 8, the resistivity measurement may be made simultaneously with the EM telemetry signal or alternatively. One option is to simply use the EM telemetry signal as the driving voltage and current. The voltage drop across insulated gap 16 and the subsequent measure electrode 32 current are measured. Alternatively, the resistivity measurement (e.g., at 100 Hz) may be alternated with the EM telemetry broadcasts (e.g., 1 Hz). This allows the resistivity measurement to be made at the same frequency in all depths. In another option, high and low frequencies may be superimposed. With a digitally controlled voltage source, the downhole processor can sum the two waveforms that drive the voltage and current across gap 16. The high frequency signal will be attenuated and will not be detected at the surface, and the low frequency signal can be filtered from the resistivity measurement.

Figure 9A:
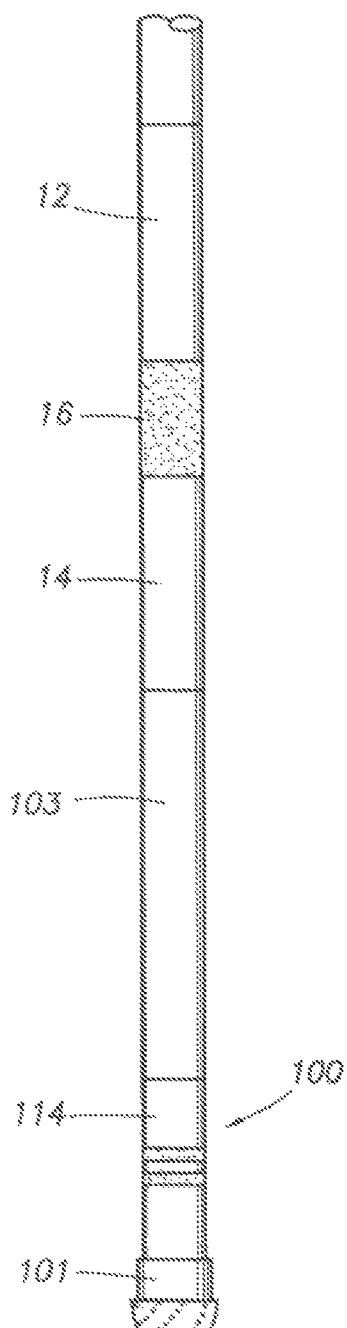
FIG. 9A is a diagram of a resistivity measurement housed in a separate sub located above the drill bit.

Referring now to FIG. 9A, a separate sub 100 containing a resistivity measurement device is located between a steerable system 103 and the drill bit 101. Insulated gap 16 is located above the steerable system 103. Drill collar section 14 is connected to drill collar of steerable system 103, which is connected in turn to resistivity sub 100. The steerable system could be a mud motor and bent sub or a rotary steerable system. In either event, drill collar sections 14, 103, and 114, and the drill bit 101 have the same electrical potential. Resistivity sub 100 contains a resistivity measurement system consisting of one or more electrodes mounted on insulation. The resistivity of the formation is measured as soon as the bit penetrates the formation, which allows for immediate decision making.

Figure 9B:
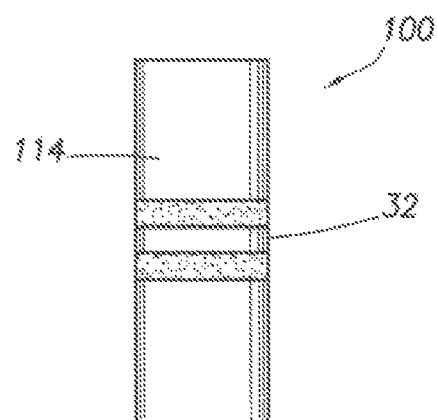
FIG. 9B is a diagram of a resistivity measurement housed in a separate sub containing a measure electrode.

FIG. 9B shows a first implementation of resistivity measurement sub 100 with a measure electrode 32. The measure electrode is maintained at the same potential as the drill collar section 114 by utilizing an electrical circuit similar to the one shown in FIG. 4. High input impedance operational amplifier 58 is used in conjunction with current calibrated resistor 60 to drive measure electrode to the same potential as the drill collar 114, and to determine the current I3. Resistivity sub 100 may be connected to the MWD tool using electrical wires and an inductive coupler. Alternatively, it may be more convenient to include a battery for power in the resistivity sub 100, and to utilize a short hop telemetry system to relay resistivity information to the MWD tool for transmission to the surface. Short hop telemetry systems include inductive transmission means. This allows the resistivity sub 100 to be mounted in front of a mud motor which might not provide a wiring path.

Figure 9C:
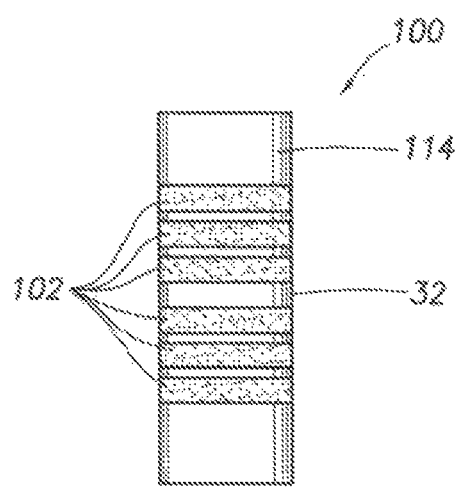
FIG. 9C is a diagram of a resistivity measurement housed in a separate sub containing measure and sense electrodes.

FIG. 9C shows a second implementation of resistivity measurement sub 100 with a measure electrode 32 and sense electrodes 102. The measurement electronics are similar to those shown in FIG. 6. The sense electrodes are monitored with a high input impedance operational amplifier and driven to the same voltage by the current I5 emitted from the measure electrode 32. As before, the current I5 is monitored via the voltage across calibrated resistor 60.

While FIG. 9A illustrates the separate resistivity sub 100 being located above the drill bit, it can be positioned anywhere in the drill string. The farther the resistivity sub 100 is located from the insulated gap 16, the deeper the radial depth of investigation of the resistivity measurement. Thus, a resistivity sub 100 could be positioned several hundred feet from the insulated gap 16, and therefore achieve a very deep depth of investigation. Several such resistivity subs 100 could be positioned along the drill string, and thus provide multiple depths of investigation. Alternatively, the resistivity measurement system could be integrated into a different drill string component. For example, electrodes and corresponding electronics could be included in a rotary steerable system and share power supply, processor, electronics, and telemetry with the rotary steerable system.

Figure 10A:
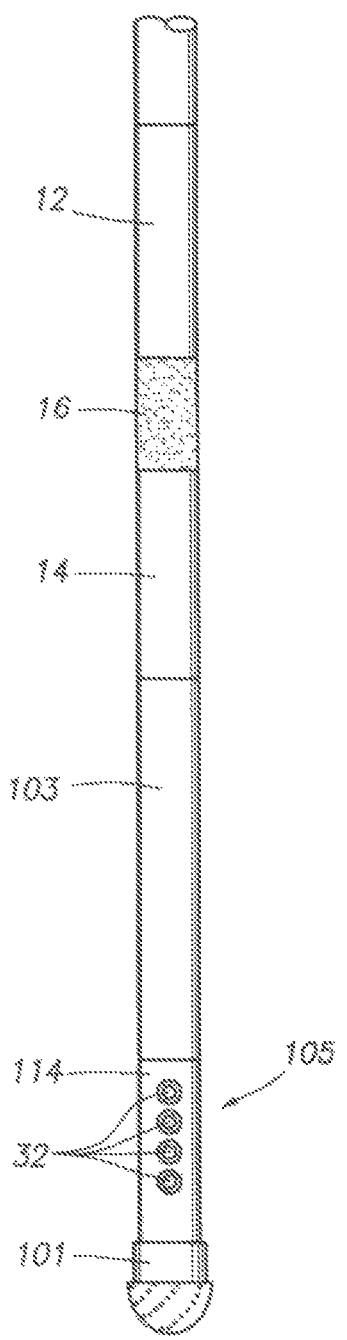
FIG. 10A is a diagram of a borehole imaging measurement in a separate sub located above the drill bit.

FIG. 10A shows a borehole imaging sub 105 located below a steerable system 103 and above drill bit 101. The borehole imaging sub collar 114 is at the same potential as the drill collar section 14 and the steerable system 103. The borehole imaging sub contains multiple button electrodes 32, with each button electrode connected to an electronics circuit, for example as shown in FIG. 4. If sense electrodes are added, then each button electrode utilizes a circuit as shown in FIG. 6. The borehole imaging sub measures the tool azimuth by using a magnetometer or accelerometer as known in the art. The button resistivities are measured as the drill string rotates and are recorded versus tool azimuth to form a resistivity image. The resulting measurements can be transmitted to the MWD tool for broadcast to the surface. The resistivity image can be used to determine dip and dip direction, to detect thin beds, and to locate open fractures.

Figure 10B:
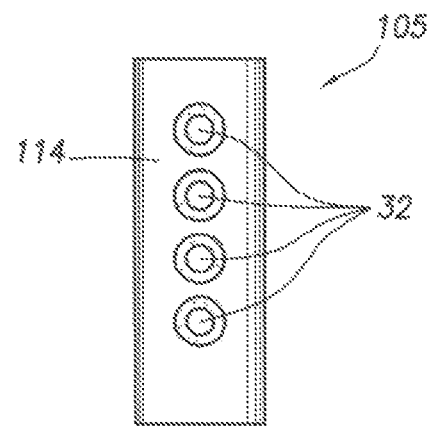
FIG. 10B is a diagram of a borehole imaging measurement sub having a circular cross-section.
Figure 10C:
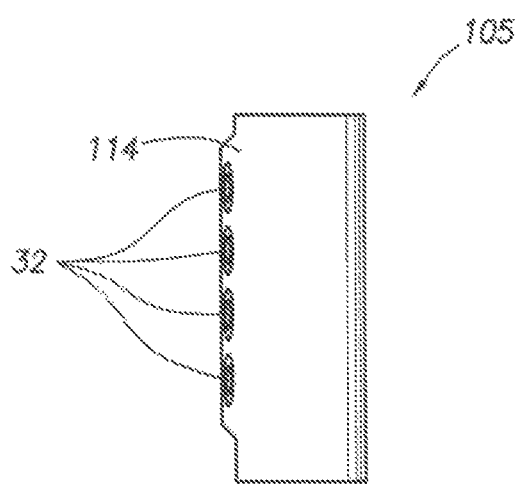
FIG. 10C is a diagram of a borehole imaging sub having button electrodes mounted on an upset.

FIG. 10B shows the button electrodes 32 mounted on a drill collar with a circular cross-section. FIG. 10C shows the button electrodes 32 mounted on an upset portion of drill collar so as to place them closer to the borehole wall. The borehole imaging sub is shown below the steerable system, but could be mounted anywhere in the drill string. The borehole imaging system could also be integrated into another drill string component, such as in a rotary steerable system.

From the foregoing detailed description of specific embodiments of the invention, it should be apparent that a system for integrating resistivity measurements into a borehole telemetry tool that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. An integrated resistivity and telemetry tool for use in a wellbore, comprising:
    a conductive tubular including first portion and a second portion separated by an insulated gap;
    an electronics cartridge carrying telemetry circuitry disposed in the first portion;
    a measure electrode carried on the second portion;
    resistivity measurement circuitry disposed on the second portion and functionally connected to the measure electrode;
    an inductive coupler disposed on the first portion and electrically and functionally connecting the electronics cartridge to the resistivity measurement circuitry; and
    wherein the resistivity measurement circuitry maintains the measure electrode at substantially the same potential as the second portion.

2. The tool of claim 1, wherein the electronics cartridge includes an ac voltage source.

3. The tool of claim 2, wherein the ac voltage source can operate at multiple frequencies.

4. The tool of claim 1, wherein the electronics cartridge is functionally connected to a sense electrode.

5. The tool of claim 1, wherein the electronics cartridge is retrievable.

6. The tool of claim 1, wherein the measure electrode includes a ring electrode, a button electrode, or any combination thereof.

7. The tool of claim 1, wherein the insulated gap and the measure electrode are separated by some distance, the distance being selected to produce a desired depth of investigation for the resistivity measurement.

8. The tool of claim 1, wherein the resistivity measurement circuitry is incorporated into a front-end electronics package.

9. The tool of claim 1, wherein the resistivity measurement circuitry comprises a low input impedance operational amplifier.

10. The tool of claim 1, wherein the resistivity measurement circuitry comprises a high input impedance operational amplifier.

11. The tool of claim 1, further comprising a sense electrode carried on the conductive tubular proximate to the measure electrode.

12. The tool of claim 11, wherein the measure electrode is a button electrode and the sense electrode is a pair of ring electrodes surrounding the button electrode.

13. The tool of claim 12 wherein the resistivity circuitry includes a high input impedance amplifier measuring the voltage difference between the pair of ring electrodes and driving the current on the measure electrode such that the voltage difference is zero.

14. The tool of claim 11, wherein the measure electrode is a ring electrode and the sense electrode comprises two pairs of sense ring electrodes, wherein one pair of sense ring electrodes is above the ring electrode and the other pair of sense ring electrodes is below the ring electrode.

15. The tool of claim 11, wherein the measure electrode is a ring electrode and the sense electrode comprises a pair of sense ring electrodes, wherein the pair of sense ring electrodes is proximate to the ring electrode.

16. The tool of claim 1, wherein the lower portion comprises all or a portion of a bottom hole assembly, the bottom hole assembly comprising one or more downhole tools.

17. The tool of claim 16, wherein the measure electrode and the resistivity measurement circuitry are part of the one or more downhole tools.

18. The tool of claim 11, wherein the resistivity measurement circuitry includes a high input impedance amplifier measuring the voltage difference between a pair of sense electrodes and driving the current on the measure electrode such that the voltage difference is zero.

19. The tool of claim 16, wherein the bottom hole assembly comprises a sub and the sub carries the measure electrode and the resistivity measurement circuitry.

20. The tool of claim 1, wherein the conductive tubular is a drill collar.

21. A method to obtain a formation resistivity measurement using a telemetry tool disposed in a wellbore, the telemetry tool including conductive tubular having a first portion and a second portion separated by an insulated gap, the method comprising:
    providing an electronics cartridge carrying telemetry circuitry disposed on the first portion:
    providing a measure electrode and resistivity measurement circuitry disposed on the second portion and functionally connected to one another;
    providing an inductive coupler disposed on the first portion and electrically and functionally connecting the electronics cartridge to the resistivity measurement circuitry;

producing a voltage across the insulated gap to drive an electric current into the formation surrounding the wellbore;

maintaining the measure electrode at substantially the same potential as the second portion;

obtaining telemetry information; and obtaining a resistivity measurement of the formation.

22. The method of claim 21, wherein the measure electrode is a button electrode and the method further comprises rotating the conductive tubular and using the button electrode to produce a resistivity image of the wellbore wall.

23. The method of claim 21, further comprising retrieving the electronics cartridge.

24. The method of claim 21, further comprising selecting a separation distance between the measure electrode and the insulated gap to provide a desired depth of investigation.

25. The method of claim 21, further comprising:

providing a pair of sense electrodes proximate to the measure electrode;

measuring a voltage difference between the pair of sense electrodes; and driving the current on the measure electrode so that the voltage difference is zero.

26. The method of claim 21, further comprising providing voltages at multiple frequencies for telemetry operations and resistivity operations.

* * * * *